United States Patent [19] [11] 3,796,992
Nakamura et al. [45] Mar. 12, 1974

[54] PRIORITY LEVEL DISCRIMINATING APPARATUS

[75] Inventors: Hideo Nakamura; Kazuo Takasugi; Fumiyuki Inose, all of Tokyo, Japan

[73] Assignee: Hitachi, Ltd., Tokyo, Japan

[22] Filed: Dec. 27, 1972

[21] Appl. No.: 318,986

[30] Foreign Application Priority Data

Dec. 27, 1971 Japan ............................ 46-105300

[52] U.S. Cl. ........................ 340/147 LP, 179/15 BA
[51] Int. Cl. ............................ H04q 3/00, H04j 3/06
[58] Field of Search ..... 340/147 R, 147 LP; 178/50, 178/58, 66; 179/15 BA

[56] References Cited

UNITED STATES PATENTS

| | | | |
|---|---|---|---|
| 3,496,293 | 2/1970 | Avery et al. | 340/147 X |
| 3,485,953 | 12/1969 | Norberg | 340/147 X |

*Primary Examiner*—Donald J. Yusko
*Attorney, Agent, or Firm*—Craig & Antonelli

[57] ABSTRACT

In a system wherein a number of processing units are connected to a single bus and wherein communication is conducted among the units on a time sharing basis, priority level discriminating apparatus is provided which includes means to detect the superposition on the bus between a bus-use request signal from another unit and a request signal from the particular unit to which the apparatus belongs, means to control the further transmission and non-transmission of the request signal in accordance with an address code previously assigned to each unit in the case where the superposition is detected, and means to issue a communication prohibition signal to the particular unit when the request signal from another unit is detected and the request signal of the particular unit is interrupted, and to generate a communication permission signal when the request signal from another unit is interrupted and the transmission of the request signal of the particular unit continues, whereby the use of the bus is allowed in the order of the magnitude of the address codes.

9 Claims, 8 Drawing Figures

PRIORITY LEVEL DISCRIMINATING APPARATUS

BACKGROUND OF THE INVENTION

1. Field of the Invention

The present invention relates to a system for controlling communication among a plurality of data processing units connected to a common bus. More particularly, it relates to priority level discriminating apparatus by which, in the case where two or more processing units simultaneously desire to communicate with another processing unit, or where, when communication is proceeding between a pair of processing units, another processing unit requests communication with either of the processing units under communication, the allotment of the bus for use (which unit is permitted to use the bus) is determined in accordance with the priority levels of request signals in such cases.

2. Description of the Prior Art

In, for example, an automated system in a research laboratory or a hospital or an automatic supervision, data gathering, control or administration system in a factor, there has been known a system in which a plurality of computers and data processing units are coupled by a common bus, whereby the communication between arbitrary ones of the units is conducted through the bus on a time sharing basis. In such a case, when a plurality of units simultaneously generate requests for communication or when any unit makes a request for communication in the process of the communication between a pair of units, it is necessary to allot the use of the bus to only a pair of processing units in the order of the priority levels of request signals.

As a system of such allotment of the use of the bus, there has hitherto been proposed one in which each processing unit detects a signal on the bus, so as to transmit data only in case where the bus is not used for communication. According to such method, however, the following problems are raised. In the case where the bus is long, it takes a considerable time to transmit a signal. Therefore, when, for example, two processing units transmit request signals for communication with another unit to the bus at the same time, the communication request signal of one of the two processing units does not reach the other processing unit at the time at which the other processing unit has transmitted the request signal of its own. As a result, both of the two processing units predetermine that the bus is not being used. It is therefore possible that data is transmitted from both the processing units to the bus, and that the signals are superimposed. In the case where the signals are superimposed, the transmitted messages are invalidated. Each processing unit retransmits data to the bus after a fixed period of time, when it detects the superposition of the signals. The fixed waiting time before the retransmission is so set as to differ for respective processing units, whereby the retransmitted data can be prevented from being superposed. With this system, after transmitting data from a certain processing unit, their superposition on data transmitted from another processing unit to the bus is checked.

Considerable time is accordingly required in order to check if the transmitted data have been correctly transferred or not. Besides, a system for transmitting data to the bus again after detecting the superposition of data is complicated. When the frequency of transmitting data onto the bus becomes high, the probability at which data are superposed becomes high to rapidly lower the transfer efficiency.

Another system for the allotment of the use of the bus has heretofore been suggested. In such a system, means is comprised by which a processing unit requesting the use of the bus at a time, specifically determined therefor in order to perform the priority discrimination of the use of the bus, transmits its own binary-coded address every bit from the highest-place bit in synchromism with clock pulses which are fed from control apparatus coupled to one end of the bus. Means is also comprised by which the signal transmitted from the particular processing unit and a signal on the bus transmitted from another processing unit are compared so that, in case where the signal on the bus is "1" at the timing at which the particular unit transmits "0," it may be prohibited from transmitting its address at and after the next clock timing. Only the address signal of the highest address number is thereby transmitted to the bus, so that permission for the use of the bus is given by a processing unit having the highest order address.

According to the above-described system, since the addresses neet be compared bit by bit, the interval of the clock pulses cannot be made shorter than the period of time in which the signal goes and comes back along the bus. A period of time required for the priority discrimination, accordingly becomes long. In addition, it is required in such a system that the signals transmitted from a plurality of processing units are correctly added on the bus. That is, the operations of "1" + "1" = "1", "1"+ "0" = "1", "0" + "1" = "1" and "0" + "0" = "0" need be correctly performed.

In a transmission system employing signals modulated by a carrier, however, the interference of the signals makes it considerably difficult to perform the correct logical sums as mentioned above. Further, such a system requires a control unit including a clock signal generator for generating the clock signals and its associated device, or the like unit. The reliability of the system depends on the central control unit, which is disadvantageous in that when the control unit fails for any reason, the whole communication system becomes unusable.

SUMMARY OF THE INVENTION

The present invention has its object in providing a novel priority-level discriminating apparatus which has solved the problems of the prior art systems as mentioned above.

Another object of the present invention is to provide apparatus which can simly determine the priority levels of the use of a common bus in the case of conducting intercommunication among a plurality of data processing units coupled to the common bus.

Still another object of the present invention is to provide a system which is also applicable to a case where signals to be transmitted to the bus, namely, signals for use in the communication, are modulated by a carrier.

Yet another object of the present invention is to provide priority level determining apparatus which is free from the necessity for employing a central control unit at one end of the bus in order to discriminate the priority levels and which effects the priority discrimination asynchronously and at high speed.

In order to accomplish such objects, the present invention has characterizing features as stated below.

1. Each processing unit coupled to the bus has means to detect whether or not the bus is under use, and means to produce a request signal for the use of the bus for a predetermined period in the case where the bus is not in use and where the particular processing unit requests the use of the bus.

2. The processing unit which is providing the request signal for the use of the bus has means to detect whether or not the request signal is superposed at a transmitting end thereof on a signal coming from another processing unit during the transmission of the request signal. In the case where the request signal for the use of the bus as provided by the particular processing unit is not superposed on the request signal from another processing unit for a prescribed period of time, the particular unit judges the unit to be selected, and transmits data onto the bus.

3. Means is provided which, in the case where the request signals are superposed, further transmits the request signal for the use of the bus to the common bus for a fixed period in accordance with a priority level, whereby the unit of the highest priority level which can use the bus is determined.

The other obects, features, and advantages of the present invention will be apparent from the following detailed description when read in conjunction with the accompanying drawings.

PREFERRED EMBODIMENTS OF THE INVENTION

Figure 1:
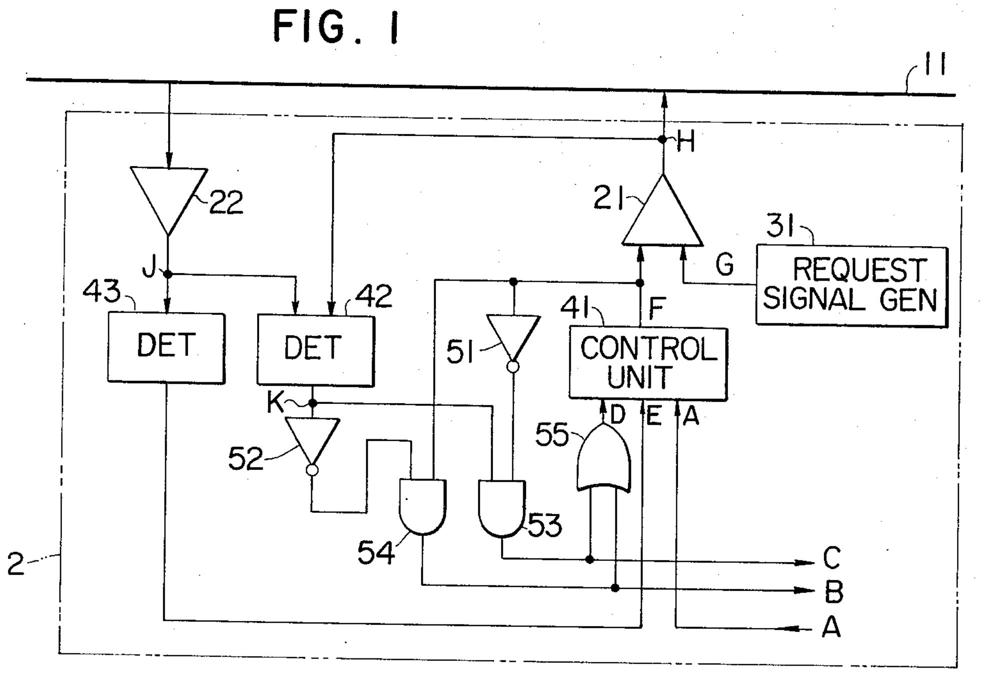
FIG. 1 is a block diagram showing an embodiment of the apparatus of the present invention.

Referring to FIG. 1, the apparatus of the present invention is included as a unit 2 for discriminating priority levels in each processing unit coupled to a common bus 11. The unit 2 comprises a line driver 21, a line receiver 22, a generator 31 for generating a signal for requesting the use of the line, a control circuit 41 for transmitting the request signal, a detector circuit 42 for detecting superposition of the request signals on the bus, a detector circuit 43 for detecting disengagement of the bus, inverters 51 and 52, and logical gates 53, 54, and 55.

Letter A represents a communication request signal, B a communication permission signal, and C a communication prohibition signal. The line request signal generated by the bus-use request signal generator 31 may take the form of a carrier signal, a random signal or any other desired signal. The line driver 21 transmits the output signal G of the request signal generator 31 after converting its level into the signal level of the bus, in case where the output F of the control circuit 41 is "1," and it inhibits the transmission, in case where the output of the control circuit 41 is "0." The control circuit 41 operates so that the output F may be made "1" in case where the communication request signal A is fed and where the output E of the line disengagement-detecting circuit 43 is "0," that is, the line is idle. The control circuit 41 further has a function by which, in the case where the signal transmitted to the bus 11 gives rise to the superposition on another signal, it is determined whether or not the line-use request signal is to be further transmitted for the next predetermined period.

Figure 2:
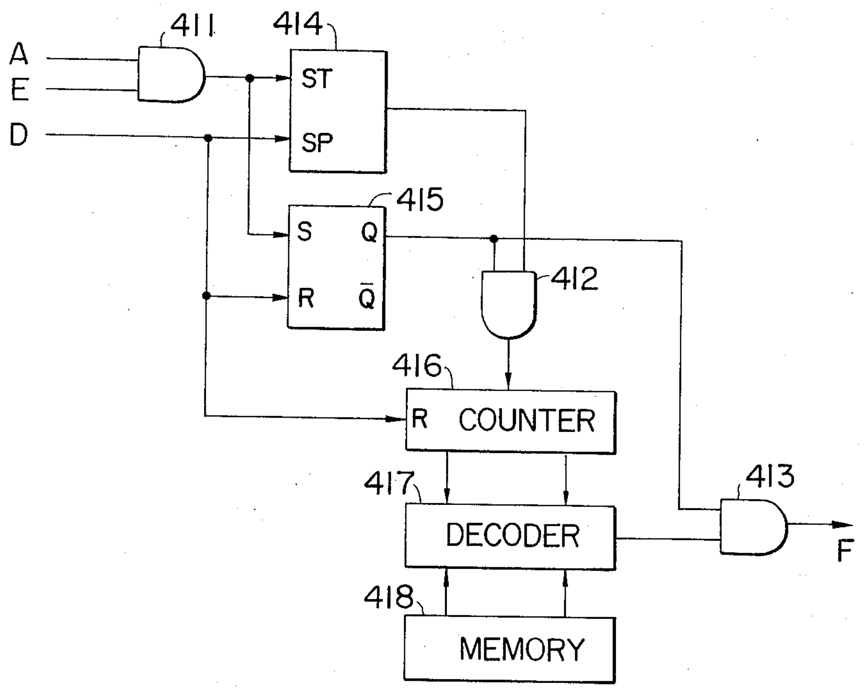
FIGS. 2 and 3 are block diagrams showing the details of the essential portions of the apparatus in FIG. 1.

A particular example of the control circuit 41 is shown in FIG. 2. In the figure the circuit 41 includes AND gates 411, 412, and 413, a flip-flop 415, a counter 416, a decoder 417, and a memory 418 in which an address specific to the corresponding processing unit is stored. A clock generator 414 outputs clock signals at fixed intervals when a start signal ST becomes "1," and stops the clock output when a stop signal SP is received. Character A indicates the communication request signal, E indicates the line disengagement signal, D indicates a priority discrimination stop signal, and F indicates the output signal of the control circuit 41.

When the bus 11 is not in the course of use for communication and the particular processing unit makes a request for communication, that is, when A = "1" and E = "1," the clock generator 414 and the flip-flop 415 are set by the output of the AND gate 411. As a result, the output of the clock generator 414 is applied through the AND gate 412 to the counter 416. The counter 416 counts clock pulses applied thereto through the AND gate 412, and the counted value is decoded by the decoder 417. The decoder 417 outputs the bit contents of that address in the memory 418 which corresponds to the count value indicated by the counter 416. Accordingly, the contents of the output are an address signal specific to the unit as previously stored in the memory 418. The address signal is derived through the AND gate 413, and becomes the signal F. When the priority discrimination stop signal D as referred to below is generated, the clock generator 414 is reset to stop the generation of the clock pulses. The flip-flop 415 is also reset and its output becomes "0," so that the AND gate 412 is closed. Simultaneously, the counter 416 is also reset, and its contents becomes "0."

As stated above, the control circuit 41 has the function of (1) outputting the signal indicative of the address peculiar to the apparatus every bit from the highest or lowest place at fixed time intervals when the communication request signal A is generated and the bus is not under use for communication, and (2) stopping its operation by the priority discrimination stop signal D.

Figure 3:
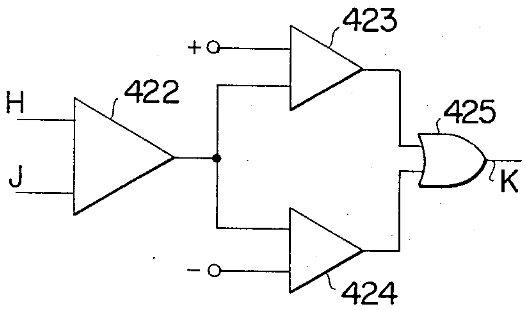

The superposition detector 42 in FIG. 1 is a circuit which detects whether or not a signal H transmitted from the line driver 21 to the bus 11 has been superposed on another signal on the bus. An example of the construction of the circuit is shown in FIG. 3. The detector circuit 42 consists of a subtractor 422 for taking the difference between two inputs H and J, comparators 423 and 424 for comparing the output of the subtractor 422 with predetermined values, and an OR gate 425 for taking the OR logic between the outputs of the comparators 423 and 424. The signal H is the one transmitted from the driver 21, while the signal J is the one received at the receiver 22. The transfer function of a path from the output end of the driver 21 to that of the receiver 22 is made 1. Since the received signal J has the transmitted signal H of the particular unit and the signal from another unit superposed on each other, the subtractor 422 outputs only the signal from the other processing unit coupled to the bus. The output signal is applied to the comparators 423 and 424 having suitable threshold levels, to have noises removed. By taking the OR logic between the outputs of the comparators 423 and 424, the presence or absence of the signal from the other processing unit can be detected irrespective of the presence or absence of the transmission of the particular unit.

The operation of the priority level discriminating apparatus shown in FIG. 1 will now be described. The line receiver 22 always receives signals on the bus 11. The disengagement detector 43 receives the output J of the receiver 22, and provides the output E which is "0" if the bus 11 is engaged or under use and which is "1" if the bus is disengaged. When the communication request signal A is generated, the control circuit 41 outputs the signal F = "1" for the idle state of the bus. The line driver 21 outputs the line-use request signal G to the bus 11 during the period during which the output signal F of the control circuit 41 is "1." The superposition detector 42 receives the transmitted signal H and the received signal J as inputs, and outputs a signal K which is "1" in the case where a signal other than the transmitted signal H of the unit is on the bus 11 and which is "0" in the case where such signal is not on the bus.

The state wherein F = "1" and K = "0" indicates that the particular unit is transmitting the line-use request signal G and no other unit is making use of the bus 11. Under this state, the output of the gate 54 is "0." That is, the output of the gate 54 becomes the communication permission signal B. In addition, the signal indicates that the allotment of the bus has been determined, namely, that the priority discrimination is no longer necessary, and it becomes the priority discrimination stop signal D of the control circuit 41.

The state wherein F = "0" and K = "1" indicates that a different unit of a higher priority level is making the request for the use of the line, and under which the output of the gate 53 is "1." That is, the output of the gate 53 becomes the communication prohibition signal C, and simultaneously becomes the priority discrimination stop signal.

The state wherein F = "0" and K = "0" or F = "1" and K = "1" indicates that the priority discrimination is not yet determined, and that the input signal D is not entered into the control circuit 41. Therefore, as has been explained with reference to FIG. 2, the control circuit 41 outputs "1" or "0" in accordance with the address of its own unit every fixed period of time until the priority discrimination is determined.

Figure 4:
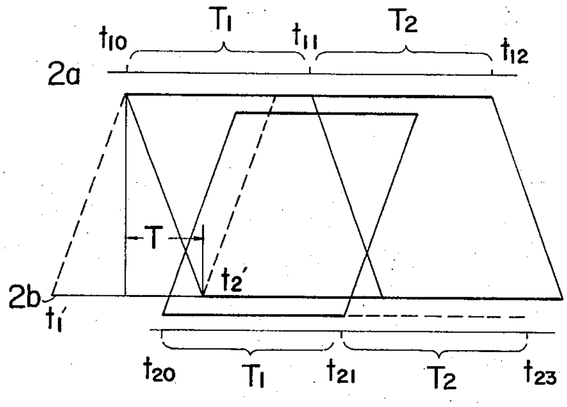
FIG. 4 is a diagram of timing relations at priority level discrimination by the apparatus in FIG. 1.

Description will now be made of the operation in the case where, for example, two processing units connected at both ends of the bus 11 transmit the communication request signals at the same time. FIG. 4 illustrates the timing relations between the line-use request signals. In the figure, the axis of abscissas represents the time, and the axis of ordinates the distance. Let it be supposed that one of the units 2a detects the disengagement of the line at a certain time $t_{10}$, at which the line-use request signal is transmitted. The signal is conveyed to the other unit 2*b* after a period of time T due to the transmission lag of the line. The period of time in which the unit 2*b* can detect the disengagement of the bus 11 to provide the line-use request signal simultaneously with the unit 2*a*, is one between $t'_1$ and $t'_2$, namely, between $(t_{10} - T)$ and $(t_{10} + T)$. Fore example, it is assumed that the unit 2*b* provides the request signal at $t_{20}$. Now, suppose that the address of the unit 2*a* is "110", while that of the unit 2*b* is "101." The line-use request signals from the units 2*a* and 2*b*, respectively, reach the opposite units in a timing relationship as shown in the figure. If the time interval between a certain bit and the subsequent bit of an address signal in case of transmitting the address from each unit is set to be longer than a period of time required for the signal to go and return along the bus, the signals from the opposite units are necessarily received at times $t_{11}$ and $t_{21}$. Then, the priority discrimination of the addresses can be made in both units.

During the period $T_1$, a comparison is made between the highest place of bits of the addresses of the units. In this example, both the bits are "1," so that the priority cannot be judged. Accordingly, the line-use request signals corresponding to the second bits of the addresses are transmitted to the bus by the unit 2*a* at the time $t_{11}$ and by the unit 2*b* at the time $t_{21}$. During the period $T_2$, the address signal of the unit 2*a* is "1," while that from the unit 2*b* is "0." Therefore, the unit 2*a* has the priority, and transmits the line-use request signal. On the other hand, the unit 2*b* interrupts the transmission of the request signal. As a result, at a time $t_{12}$, the processing unit 2*a* detects that only the unit is making the request for the use of the line, and generates the communication permission signal A.

On the side of the unit 2*b*, at a time $t_{23}$, it is detected that the unit of a priority level higher than that of the particular unit itself is making a request for the use of the line, and the communication prohibition signal C is generated. Thus, the priority discrimination is completed in the periods $T_1$ and $T_2$. In general, in the case where a plurality of units are making a request for the use of the bus, the priority discrimination is completed at the bit time at which a difference appears in the every-bit comparisons of the address codes of the units, and it is not necessary to compare all the bits of the addresses.

In the foregoing, it has been assumed that the two units are located at respective ends of the bus. In the case where they are positioned at intermediate parts of the bus, the transmission lag of the signals is shorter. Therefore, if the time interval of the bits of the respective address signals, namely, the time interval of the clock pulses is made larger than 2T, the respective processing units can be coupled with the line at any desired points on the line. The initiation of the transmission of the line-use request signal requires only to detect the free state of the line, and does not need the synchronism with a different unit.

In the above embodiment, when a plurality of processing units coupled to the bus request the use of the bus at the same time, the priority levels are determined by the magnitude of the fixed address numbers previousy stored in the memories of the respective units. The priority levels can also be altered at random.

To this end, for example, the component 416 in FIG. 2 may be provided as a ring counter, so as to prevent the reset signal from being applied. In this case, the ring counter 416 has such a function that, when the counted contents reach a predetermined value, it is automatically reset to zero to restart counting from zero. Further, in case where the respective bits of the address stored in the memory 418 are shifted each bit from a higher place to a lower place and where bits thereby caused to overflow are continued to the lowest place bit, it is required that the address at an arbitrary time not be coincident with the address of another unit.

The contents of the counters 416 at the time when the priority discrimination of any unit has been completed, indicate irregular values among the units. The times at which the requests for communication by two specific units coincide are irregular. Furthermore, the counters 416 of the units at the time of the coincidence are not associated with each other. Therefore, even when the addresses in the memories 418 are fixed, it is irregularly determined which unit is selected. By suitable selection of addressing, however, it can be ensured that the time series of the outputs F of the control circuits 41 of two arbitrary units at arbitrary times are different. Therefore, if the priority discriminating operations are conducted by at least the number of times corresponding to the number of bits of the addresses, only one of a plurality of units making requests for the use of the bus can be selected without fail.

Figure 5:
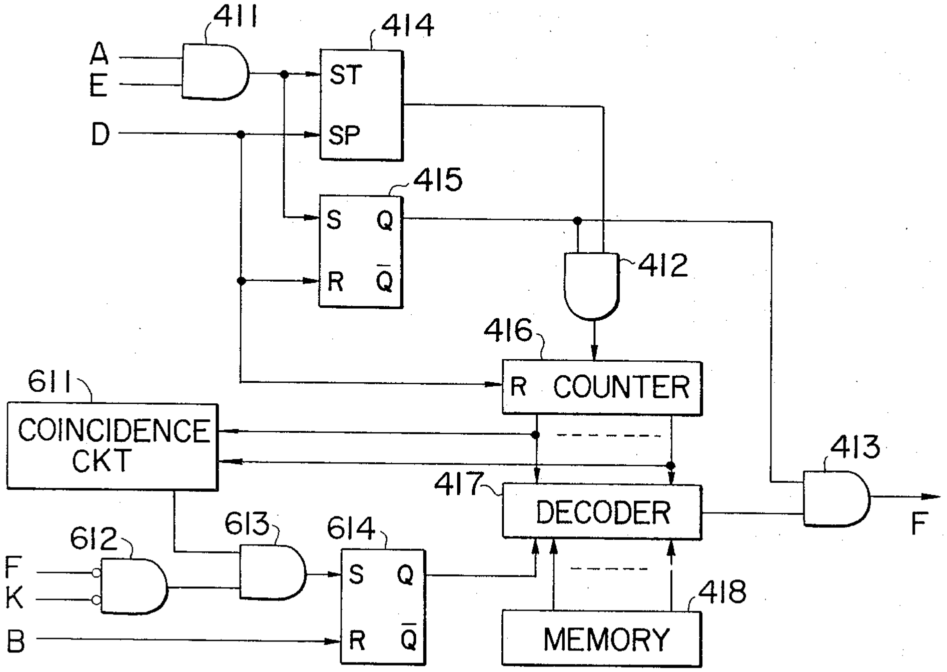
FIGS. 5 and 6 are block diagrams each showing another embodiment of the present invention.

In another system, the line use request signal-control circuit 41 is constructed as illustrated in FIG. 5. The arrangement in FIG. 5 comprises, in addition to the circuit in FIG. 2, a coincidence circuit 611 a NAND gate 612, an AND gate 613 and a flip-flop 614. The coincidence circuit 611 outputs "1" only when the contents of the counter 46 indicate a specified value. To the bit position indicated by those contents of the counter 416 by which the output of the coincidence circuit 611 is made "1," the output of the flip-flop 614 is applied. The address of each unit is formed of the bit set from the output of the flip-flop 614, and a signal stored in the memory 418. That is, the address of the unit can have the specific bit varied to "1" and "0" by the output of the flip-flop 614.

The operation of the circuit in FIG. 5 will be described hereunder. At F = "0" and K = "0," namely, at the priority discrimination, the NAND gate 612 provides "1" in the case where neither the given unit nor another unit transmits the line-use request signal. In the case where the output of the coincidence circuit 611 becomes "1" at the time at which the output of the NAND gate 612 is "1," the output of the AND gate 613 becomes "1" to set the flip-flop 614. The flip-flop 614 is reset by the communication permission signal B. By way of example, when the output bit of the flip-flop 614 is added to the highest place bit of the address stored in the memory 418, the contents of the flip-flop 614 are transmitted at the first timing of the output F provided from the control circuit 41. Accordingly, even when the address previously stored in the memory 418 is the largest (the priority is the highest), the address is smaller, if the output of the flip-flop 614 for the particular unit is "0," than that of a unit for which the output of the flip-flop 614 is "1." This leads to the fact that the particular unit is lower in priority than the unit having the output "1" of the flip-flop.

Therefore, in the case where the requests for the use of the bus by the two units are coincident, the unit is selected whose address priority including the output bit of the flip-flop 614 is higher. When a certain unit coupled to the bus is permitted to use the bus, the communication permission signal B is generated to thereby reset the flip-flop 614. As a result, in the case where the requests by the same two units as in the above are next brought into coincidence, the unit other than the previously selected one is selected since the unit of the previous selection has the contents of its flip-flop 614 made "0."

On the average versus time, all the units have priority levels thus assigned substantially equally. If the output of the flip-flop 614 is brought into correspondence with any desired position of the address, the operation as in the foregoing can be effected among units specified by bits in places below the position. More specifically, a group of units are specified by bits of higher places than the place of the variable bit the contents of which change in conformity with the output of the flip-flop 614, and the addresses of the respective units within the group are specified by bits of lower places. Then, a system can be realized according to which the groups have fixed priority levles, while the units within one group can use the bus substantially equally regardless of the magnitude of the address numbers.

Figures 6, 7:
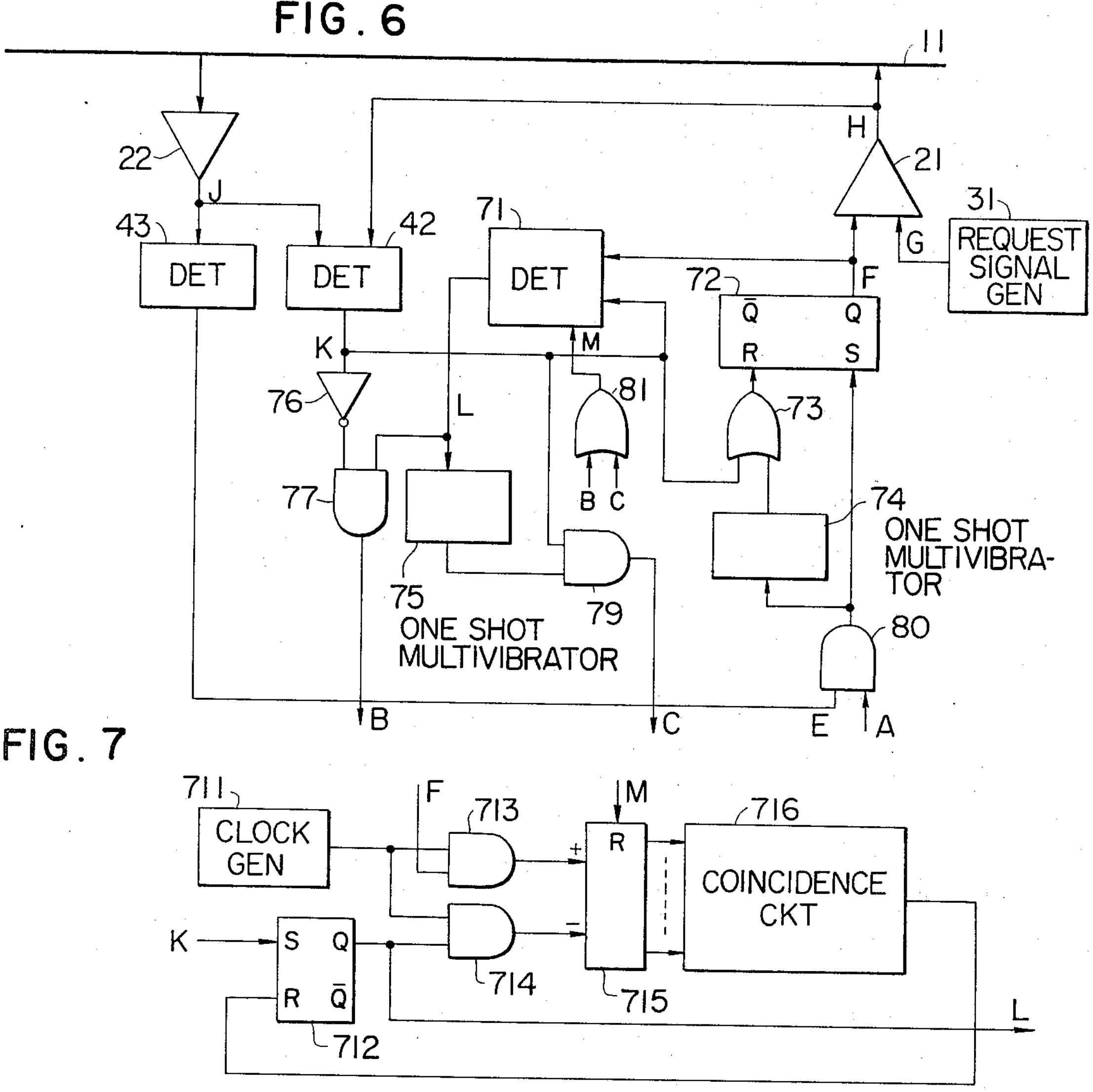
FIG. 7 is a block diagram showing the details of the essential portion of the apparatus in FIG. 6.

Although, in the above embodiment, the allotment of the use of the bus is determined by the contents of the memory 418 and the flip-flop 614 which are provided in the priority discriminating circuit 2, it is also possible that the priority discrimination on the requests for the use of the line is determined by the earliness of the generation timings of the requests for the use. Usually, however, the line is long and the units are dispersively coupled to the line, so that a time lag unavoidable for the bus-use request signal to transfer along the line raises a problem. The reson is that, when a certain unit generates the bus-use request signal and another unit also makes the request for the use of the bus within a period of time required for the request signal of the certain unit to go and return along the line, the priority is not determined. FIG. 6 shows another embodiment of the present invention which is free from the above disadvantage. In the figure the same parts as in FIG. 1 are designated with the same reference symbols.

Referring to FIG. 6, numeral 71 indicates a priority discriminating interval detector, 72 a flip-flop, 73 and 81 OR gates, 74 and 75 one-shot multivibrators, 76 an inverter, and 77, 79, and 80 AND gates. The one-shot multivibrator 74 is triggered by the output of the AND gate 80, and generates a pulse which has a duration longer than the transmission time required for the bus-use request signal to go and return between respective ends of the line. In synchronism with the fall of the output of the priority discriminating interval detector 71, the one-shot multivibrator 75 generates a single pulse which has a duration sufficient to start the AND gate 79. The priority discriminating interval detector 71 is a circuit changing into the state "1" at the time at which the output F of the flip-flop 72 changes from "1" to "0," and providing the output "1" for the same period of time as that for which the output F has been "1."

An example of the construction of the priority discriminating interval detector 71 is shown in FIG. 7. Referring to the figure, numeral 711 designates a clock generator, 712 a flip-flop, and 713 and 714 AND gates. Shown at 715 is an up-down counter, which counts such that "1" is added to its contents when a clock pulse is fed to a termina; "+" thereof, and "1" is subtracted from its contents when the input is fed to a termina; "−" thereof. Further, when the pulse is fed to a terminal R of the counter 715, its contents are reset.

Numeral 716 represents a coincidence circuit, which produces "1" at the time at which the contents of the up-down counter 715 become "0."

In the above construction, while the output F of the flip-flop 72 is maintained at the AND gate 713, the clock pulses from the clock generator 711 are entered through the gate 713 into the counter 715 and are counted therein. On the other hand, when the output K of the superposition detector 42 becomes "1," the flip-flop 712 is set. As a result, the clock pulses are fed through the gate 714 to the "—" terminal of the counter 715. Accordingly, the contents of the counter 715 are subtracted. When they become "0," the coincidence circuit 716 provides the output to reset the flip-flop 712. Thus, the output L of the flip-flop 712 becomes a pulse which has a duration equal to that for which the signal F has been "1" after K becomes "1."

The operation of the system in FIG. 6 will now be described. When the communication request signal A is generated and the output E of the line disengagement detecting circuit 43 is "1," the flip-flop 72 is set. From that time on, the line-use request signal G is transmitted through the driver 21 onto the bus 11. At the same time that the flip-flop 72 is set by the output of the AND gate 80, the one-shot multivibrator 74 is triggered. The output F of the flip-flop 72 opens the gate of the line driver 21, and simultaneously, it is applied to the priority interval discrimination detector 71. Then, the detector 71 starts counting the transmission interval of the signal F. The transmission signal H from the driver 21 to the bus 11 is simultaneously applied to the superposition detector 42. With the signal and the output J of the line receiver 22, the superposition detection is performed to provide the output K. In the absence of the superposition, K remains "0," the output F of the flip-flop 72 is reset and becomes "0" in synchronism with the fall of the pulse of the one-shot multivibrator 74, and the output L of the priority discriminating circuit 71 becomes "1." As a result, the output of the AND gate 77 becomes "1" to transmit the communication permission signal B.

In the presence of the superposition, the output K of the superposition detector 42 becomes "1," the flip-flop 72 is reset by the signal, and the priority discriminating interval detector 71 outputs "1" from that time for the period of time for which the signal F has been "1." In synchronism with the fall of the priority discriminating interval detector 71, one-shot multivibrator 75 outputs a pulse. At this time, if K = "1" or there is a superposition, the communication prohibition signal C is outputted, while if K = "0" or there is no superposition, the communication permission signal B is outputted. The signals B and C are applied to the OR gate 81, the priority interval discriminating detector 71 is reset by the output M of the OR gate, and thus, the priority discrimination is completed.

Figure 8:
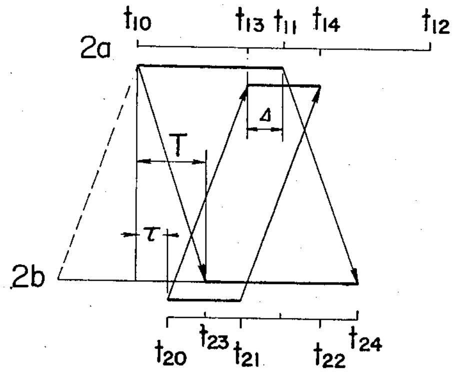
FIG. 8 is a diagram of timing relations at priority discrimination by the apparatus in FIG. 6.

Description will now be made of an operation in the case where the line-use request signals generated at respective ends of the line 11 are superposed. FIG. 8 shows the timing relationship between them. In the figure two processing units are indicated by 2*a* and 2*b*, and the axis of the abscissas represents the time, while the axis of the ordinates represents the distance. Let T be the period of time in which each signal is transferred one way, let $\tau$ be the difference between the times of transmission of the line-use request signals of the units 2*a* and 2*b*, and let $\Delta$ be the period of time between the arrival of the signal from the opposite unit and the recognition of the superposition. The time of starting of the signal transmission from the unit 2*a* is made $t_{10}$. Then the signals from the two units are superposed only in the case where the time of starting the signal transmission from the unit 2*b* lies with the range of $t_{10} \pm T$. Let $t_{20}$ be the signal starting time of the unit 2*b*, $t_{13}$ be the time at which the signal from the unit 2*b* arrives at the unit 2*a*, and $t_{11}$ the time at which the arrival is recognized and the signal transmission is stopped in the unit 2*a*. Similarly, let $t_{23}$ be the time at which the signal from the unit 2*a* arrives at the unit 2*b*, and $t_{21}$ be the time at which the unit 2*b* recognizes the arrival to stop the signal transmission. Further, let $t_{14}$ be the time at which the superposition of the signals disappears on the bus to which the unit 2*a* is coupled, $t_{12}$ be the maximum time for the priority discrimination, $t_{24}$ be the time at which the superposition of the signals disappears in the unit 2*b*, and $t_{22}$ be the maximum time for the priority discrimination.

The circuit in FIG. 6 has the function of detecting the relation in magnitude between $t_{12}$ and $t_{14}$ or between $t_{22}$ and $t_{24}$ to conduct the priority discrimination. That is, if $t_{12} > t_{14}$ in the unit 2*a*, the communication permission signal is provided, whereas if $t_{12} < t_{14}$, the communication prohibition signal is provided. The same applies to the unit 2*b*. Relations among $t_{10}$, $t_{12}$, $t_{14}$, $t_{20}$, $t_{22}$, and $t_{24}$ are as follows: $t_{12} = t_{10} + 2T + 2\tau + 2\Delta$, $t_{14} = t_{10} + 2T + \Delta$, $T_{22} = t_{10} + 2T + 2\Delta - \tau$ and $T_{24} = t_{10} + 2T + \tau + \Delta$. Therefore, $T_{12} - T_{14} = 2\tau + \Delta$ and $T_{22} - T_{24} = \Delta - 2\tau$. In consequence, if $\tau > ½\,\Delta$, $T_{12} > T_{14}$ and $T_{22} < T_{24}$, so that the unit 2*a* is selected and the unit 2b is prohibited. If $\tau < -½\,\Delta$, $T_{12} < T_{14}$ and $T_{22} > T_{24}$, so that the unit 2*b* is selected and the unit 2*a* is prohibited. At $-½\,\Delta < \tau < ½\Delta$, $T_{12} > T_{14}$ and $T_{22} < T_{24}$, so that the units 2*a* and 2*b* are both selected. That is to say, as regards the requests for the use of the line which arise in a manner to differ in time by the above signal superposition-detecting period $\Delta/2$, this system can select the unit of the earlier signal transmitting time irrespective of the length of the line. In other words, this system shortens the minimum period for distinguishing earliness from lateness of the time of transmitting the signal to the line, from the transmission lag T of the signal to the superposition detecting period $\Delta/2$. In the case of a long line, $T >> \Delta$, and the present system is especially effective. The above operation similarly proceeds even in the case where the signal is applied to an intermediate part of the line.

As described above, in accordance with the present invention, in the case where a plurality of units for intercom-munication are coupled to a common data line and where the intercommunication among them is performed on a time sharing basis, it is made possible to allow the unit of the highest priority level among coincident requests for communication to use the data line. According to the system, any common hardware need not be coupled to the bus for the purpose of the priority discrimination, and the judgments are made in the individual units. Accordingly, even when one of the units fails for any reason, the other units are subject to no influence, which realizes a highly-reliable communication control. In addition, the system is advantageous in that the respective units can operate quite independently, and the priority discrimination can be effected asynchronously. Furthermore, in the presence of the super-position of the signals, the priority discrimination may be performed until the superposition is eliminated, while in the absence of the superposition, data can be immediately transmitted. This can make the communication high.

What is claimed is:

1. In a communication system wherein a plurality of processing units connected to a common bus carry out intercommunication through said bus in a time sharing manner, priority level discriminating apparatus provided in each of said processing units for judging the propriety of the allotment of the use of said bus as to a request for communication by the given processing unit, comprising:

1. other-signal detector means connected to said bus for detecting the presence or absence of a bus-use request signal on said bus from another processing unit, to provide an output corresponding to the presence or absence of said signal,
2. generating means to generate a bus-use request signal which is to be transmitted to said bus when said given processing unit requests the use of said bus, and which consists of a binary address code assigned peculiarly to said given processing unit, and
3. control means for controlling the transmission and non-transmission of said signal from the bus-use request signal generating means to said bus in accordance with said output of said detector means and the communication request signal from said processing unit, said control means including:

a. first means for transmitting said bus-use request signal of the given processing unit to said bus, when the non-transmission of said bus-use request signal from another processing unit to said bus is detected by said detector means and said given processing unit is generating said communication request signal,
b. second means for controlling said first means to control the transmission and non-transmission of said bus-use request signal in accordance with the state of each bit of said peculiar binary address code assigned to said given processing unit, when the transmission of said request signal from another processing unit to said bus is detected by said detector means and said given processing unit is making the request for communication,
c. third means for generating a communication prohibition signal for said given processing unit, when the interruption of said bus-use request signal from said given processing unit is detected by said second means and the transmission of said request signal from another processing unit is detected by said detector means, and
d. fourth means for generating a communication permission signal for said given processing unit, when the interruption of said bus-use request signal from another processing unit is detected by said detector means and the transmission of said bus-use request signal from said given processing unit is detected.

2. Priority level discriminating apparatus according to claim 1, wherein said second means of said control means comprises a memory which stores said address code peculiar to the given processing unit, timing means to derive the contents of said address code every bit sequentially from a bit of either one of the highest and lowest places of said address code, and means for enabling said first means to transmit said bus-use request signal to said bus when the code of said bit is "1" and to interrupt the transmission of said bus-use request signal when said code is "0."

3. Priority level discriminating apparatus according to claim 2, further comprising means to modify the state of any specified one of the bits of said address code every time said communication permission signal for said particular processing unit is generated, so that the opportunities of the use of said bus may be given to said respective processing units substantially equally.

4. Priority level discriminating apparatus according to claim 2, wherein said timing means includes a clock signal generator actuated by coincident receipt of said request signal and an output of said detector means representing absence of a signal on the bus, a ring counter connected to receive said clock signal, and a decoder connected to said ring counter and said memory for providing the contents of said address code sequentially.

5. Priority level discriminating apparatus according to claim 4, wherein said timing means further includes a coincidence circuit receiving the output of said ring counter, an AND gate having one input connected to the output of said coincidence circuit, a NAND gate having a pair of inputs receiving said bus-use signal of the given unit and the output of said detector means and having an output connected to a second input of said AND gate, a flip-flop having a set input connected to the output of said AND gate and a reset input receiving said permission signal, the output of said flip-flop being applied to said decoder so that the address of the given unit is formed by the output of said memory and said flip-flop.

6. Priority level discriminating apparatus according to claim 5, wherein said other-signal detector means includes a first detector connected to said bus for providing an output when no signal is detected on the bus and a second detector connected to the bus and said generating means for detecting superposition of bus-use request signals on the bus.

7. In a communication system wherein a plurality of processing units connected to a common bus carry out intercommunication through said bus in a time sharing manner, priority level discriminating apparatus for determining the allotment of the use of said bus as to a request for communication from each of said processing units, comprising:

1. other-signal detector means for detecting a bus-use request signal on said bus from another processing unit, to provide an output corresponding to the presence or absence of said signal,
2. generating means to generate a bus-use request signal which is to be transmitted to said bus when the use of said bus is requested, and
3. control means for controlling the transmission and non-transmission of said signal from the bus-use request signal generating means in accordance with said output of said detector means and the communication request signal from said processing unit, said control means including:

a. first means for transmitting said bus-use request signal of the given processing unit to said bus, when said bus-use request signal from another processing unit is not being transmitted to said bus and said given processing unit is making a request for communication, b. second means for stopping the transmission of said bus-use request signal from said given unit, when said bus-use request signal from another processing unit is detected by said other-signal detector means in the course of the transmission of said bus-use request signal by said first means, and c. third means for detecting said request signal from another unit from the time of the stopping for a period equal to that between the starting and stopping of the transmission of said request signal of said given unit, and to produce a communication prohibition signal for said particular processing unit when said request signal from another unit is detected and to produce a communication permission signal when it is not detected, whereby the processing unit having transmitted said bus-use request signal to said bus earliest is permitted to use said bus.

8. Priority level discriminating apparatus according to claim 7, wherein said other-signal detector means includes a first detector connected to said bus for providing an output when no signal is detected on the bus and a second detector connected to the bus and said generating means for detecting superposition of bus-use request signals on the bus.

9. Priority level discriminating apparatus according to claim 8, wherein said second means includes a oneshot multivibrator connected to said other-signal detector means for generating a prohibition signal to stop the transmission of said bus-use request signal when a superposition of signals is detected by said second detector.

* * * * *